United States Patent
Yanachi et al.

(10) Patent No.: US 12,298,021 B2
(45) Date of Patent: May 13, 2025

(54) AIR CONDITIONING SYSTEM AND METHOD FOR CONTROLLING ELECTRICAL ENERGY OF AIR CONDITIONING SYSTEM

(71) Applicant: Mitsubishi Electric Corporation, Tokyo (JP)

(72) Inventors: Satoru Yanachi, Tokyo (JP); So Nomoto, Tokyo (JP); Kazuyoshi Shinozaki, Tokyo (JP); Yasushi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 413 days.

(21) Appl. No.: 17/918,705

(22) PCT Filed: Jun. 18, 2020

(86) PCT No.: PCT/JP2020/023902
§ 371 (c)(1),
(2) Date: Oct. 13, 2022

(87) PCT Pub. No.: WO2021/255884
PCT Pub. Date: Dec. 23, 2021

(65) Prior Publication Data
US 2023/0147599 A1 May 11, 2023

(51) Int. Cl.
*G05B 19/042* (2006.01)
*F24F 11/47* (2018.01)
*F24F 11/63* (2018.01)

(52) U.S. Cl.
CPC .............. *F24F 11/63* (2018.01); *F24F 11/47* (2018.01); *G05B 19/042* (2013.01); *G05B 2219/2614* (2013.01)

(58) Field of Classification Search
CPC ......... F24F 11/63; F24F 11/47; G05B 19/042; G05B 2219/2614
See application file for complete search history.

(56) References Cited

U.S. PATENT DOCUMENTS

2014/0297057 A1  10/2014  Tanaka et al.

FOREIGN PATENT DOCUMENTS

| JP | 2012229857 A | * | 11/2012 |
| WO | 2013/061399 A1 | | 5/2013 |

OTHER PUBLICATIONS

International Search Report of the International Searching Authority mailed Sep. 1, 2020 for the corresponding International Patent Application No. PCT/JP2020/023902 (and English translation).

* cited by examiner

*Primary Examiner* — Michael W Choi
(74) *Attorney, Agent, or Firm* — Posz Law Group, PLC (57) ABSTRACT

An air conditioning system comprises one or more air conditioners through which refrigerant circulates, and a first controller. For each of one or more indoor units, a score corresponding to a cost of using the indoor unit is preset. The first controller calculates, for each of the one or more air conditioners, a first total value of a score of each of the one or more indoor units included in the air conditioner. The first controller calculates a second total value of the first total value of each of the one or more air conditioners. When an electrical energy limit condition is satisfied, the first controller sets for each of the one or more air conditioners a drive frequency for a compressor included in the air conditioner according to a ratio of the first total value of the air conditioner to the second total value.

6 Claims, 11 Drawing Sheets

AIR CONDITIONING SYSTEM AND METHOD FOR CONTROLLING ELECTRICAL ENERGY OF AIR CONDITIONING SYSTEM

CROSS REFERENCE TO RELATED APPLICATION

This application is a U.S. national stage application of PCT/JP2020/023902 filed on Jun. 18, 2020 the contents of which are incorporated herein by reference.

TECHNICAL FIELD

The present disclosure relates to an air conditioning system and a method for controlling electrical energy of the air conditioning system.

BACKGROUND ART

A conventionally known air conditioning system sets priority for each of a plurality of indoor units according to necessity of air conditioning. For example, WO 2013/061399 (PTL 1) discloses a heat pump system comprising a plurality of indoor units. In the heat pump system, a user sets a priority for a workspace depending on a frequency of use or a level of importance so that even when a total of the maximal cooling capacities of the indoor units exceeds a maximal cooling capacity of an outdoor unit an indoor unit for a workspace having a large air conditioning load can be operated at a rated capacity. Further, an indoor unit for a workspace highly requiring air conditioning can be operated at a rated capacity. This ensures that the workplace is comfortable.

CITATION LIST

Patent Literature

PTL 1: WO 2013/061399

SUMMARY OF INVENTION

Technical Problem

In the heat pump system disclosed in PTL 1, a plurality of indoor units are provided for one compressor. As a configuration of an air conditioning system, however, a configuration in which a plurality of indoor units are provided for a plurality of compressors is also expected. In demand control performed in response to a demand request (or an electrical energy limit request), there is a problem in how to fairly allocate limited electrical energy to one or more compressors based on a cost accompanying using each of a plurality of indoor units. For the heat pump system disclosed in PTL 1, however, no consideration is given to fair distribution of a cost accompanying using each of a plurality of indoor units.

The present disclosure has been made in order to solve the above-described problem, and an object of the present disclosure is to improve fairness of distribution of a cost accompanying utilization of air conditioning while achieving electrical energy limitation in an air conditioning system comprising one or more air conditioners.

Solution to Problem

An air conditioning system according to an aspect of the present disclosure comprises one or more air conditioners in which refrigerant circulates, and a first controller. When an electrical energy limit condition is satisfied, the first controller limits electrical energy consumed per unit time by the one or more air conditioners. The one or more air conditioners each include a compressor and one or more indoor units. For each of the one or more indoor units, a score corresponding to a cost of using the indoor unit is preset. The first controller calculates, for each of the one or more air conditioners, a first total value of a score of each of the one or more indoor units included in the air conditioner. The first controller calculates a second total value of the first total value of each of the one or more air conditioners. When the electrical energy limit condition is satisfied, the first controller sets for each of the one or more air conditioners a drive frequency for the compressor included in the air conditioner according to a ratio of the first total value of the air conditioner to the second total value.

According to another aspect of the present disclosure, when an electrical energy limit condition is satisfied, a method for controlling electrical energy of an air conditioning system limits electrical energy consumed per unit time by one or more air conditioners in which refrigerant circulates. The one or more air conditioners each include a compressor and one or more indoor units. For each of the one or more indoor units, a score corresponding to a cost of using the indoor unit is preset. A method for controlling electrical energy of an air conditioning system comprises: calculating for each of one or more air conditioners a first total value of a score of each of one or more indoor units included in the air conditioner; calculating a second total value of the first total value of each of the one or more air conditioners; and, when the electrical energy limit condition is satisfied, for each of the one or more air conditioners, setting a drive frequency for the compressor included in the air conditioner according to a ratio of the first total value of the air conditioner to the second total value.

Advantageous Effects of Invention

According to the presently disclosed air conditioning system and method for controlling electrical energy thereof, when an electrical energy limit condition is satisfied, for each of one or more air conditioners, a drive frequency for a compressor included in the air conditioner can be set according to a ratio of a first total value of the air conditioner to a second total value to improve fairness of distribution of a cost accompanying utilization of air conditioning while achieving electrical energy limitation.

DESCRIPTION OF EMBODIMENTS

Hereinafter, embodiments of the present disclosure will be described in detail with reference to the drawings. In the figures, identical or corresponding components are identically denoted and will not be described redundantly in principle.

First Embodiment

Figure 1:
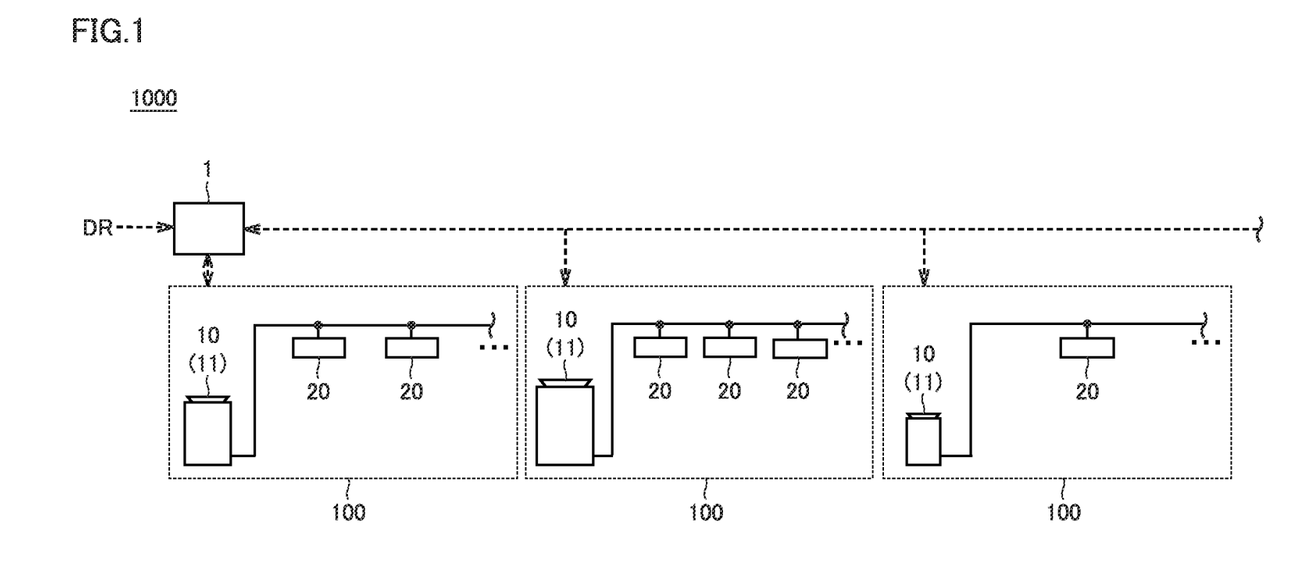
FIG. 1 is a functional block diagram showing a configuration of an air conditioning system according to a first embodiment.

FIG. 1 is a functional block diagram showing a configuration of an air conditioning system 1000 according to a first embodiment. As shown in FIG. 1, air conditioning system 1000 comprises a demand controller 1 (a first controller) and a plurality of air conditioners 100. The plurality of air conditioners 100 each include a heat source unit 10 and one or more indoor units 20. Refrigerant circulates through each of the plurality of air conditioners 100. For each of one or more indoor units 20, a priority score corresponding to a cost of using indoor unit 20 is preset. The cost of using indoor unit 20 includes, for example, a rent for a space in which indoor unit 20 is installed, and an electricity fee determined by a contract. Air conditioning system 1000 may comprise one air conditioner 100.

Demand controller 1 performs an electrical energy monitoring process for the plurality of air conditioners 100 for every sampling time. Specifically, when demand controller 1 receives a demand request DR (an electrical energy limit request) in the electrical energy monitoring process, demand controller 1 performs demand control to reduce electrical energy consumed by the plurality of air conditioners 100 per unit time. Demand request DR is issued, for example, from an electrical energy management system that integrally manages electrical energy of a plurality of systems including air conditioning system 1000 when a possibility of insufficient electrical energy is increased due to shortage of electrical energy.

Figure 2:
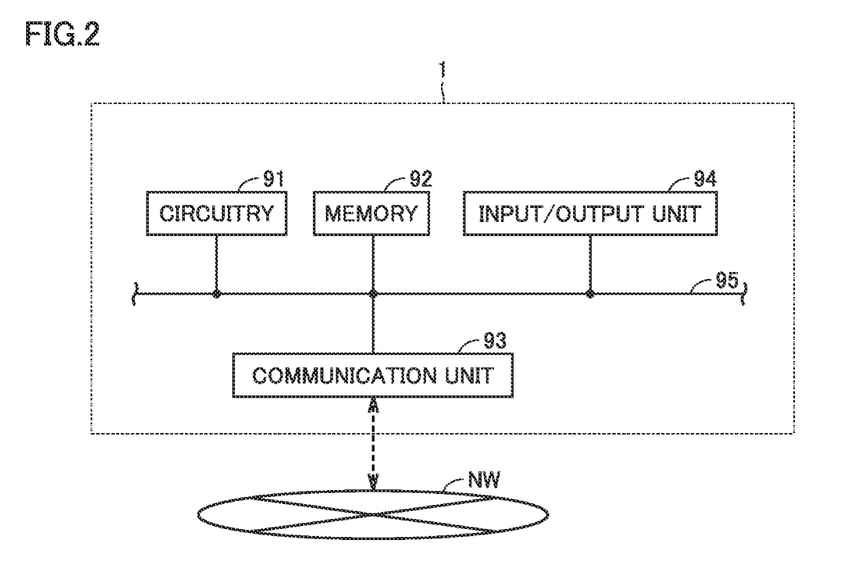
FIG. 2 is a functional block diagram showing a configuration of a demand controller shown in FIG. 1.

FIG. 2 is a functional block diagram showing a configuration of demand controller 1 shown in FIG. 1. As shown in FIG. 2, demand controller 1 includes circuitry 91, a memory 92, a communication unit 93, and an input/output unit 94. Circuitry 91, memory 92, communication unit 93, and input/output unit 94 are interconnected via a bus 95.

Circuitry 91 may be dedicated hardware or a central processing unit (CPU) configured to execute a program stored in memory 92. When circuitry 91 is dedicated hardware, circuitry 91 corresponds for example to a single circuit, a composite circuit, a programmed processor, a parallel-programmed processor, an application specific integrated circuit (ASIC), a field programmable gate Array (FPGA), or a combination thereof. When circuitry 91 is a CPU, demand controller 1 has functionality implemented by software, firmware, or a combination of software and firmware. The software or firmware is written as a program and stored in memory 92. Circuitry 91 reads and executes a program stored in memory 92. The CPU is also referred to as a central processing unit, a processing unit, an arithmetic unit, a microprocessor, a microcomputer, a processor, or a digital signal processor (DSP). Memory 92 includes a non-volatile or volatile semiconductor memory (e.g., random access memory (RAM), read only memory (ROM), flash memory, erasable programmable read only memory (EPROM), or electrically erasable programmable read only memory (EEPROM)), and a magnetic disk, a flexible disk, an optical disk, a compact disk, a mini disk, or a digital versatile disc (DVD).

Communication unit 93 communicates with each of the plurality of air conditioners 100 via a network NW. Network NW includes, for example, a local area network (LAN), a wide area network (WAN), or the Internet.

Input/output unit 94 receives an operation from a user and outputs a processing result to the user. Input/output unit 94 includes, for example, a mouse, a keyboard, a touch panel, a display, and a speaker.

Figure 3:
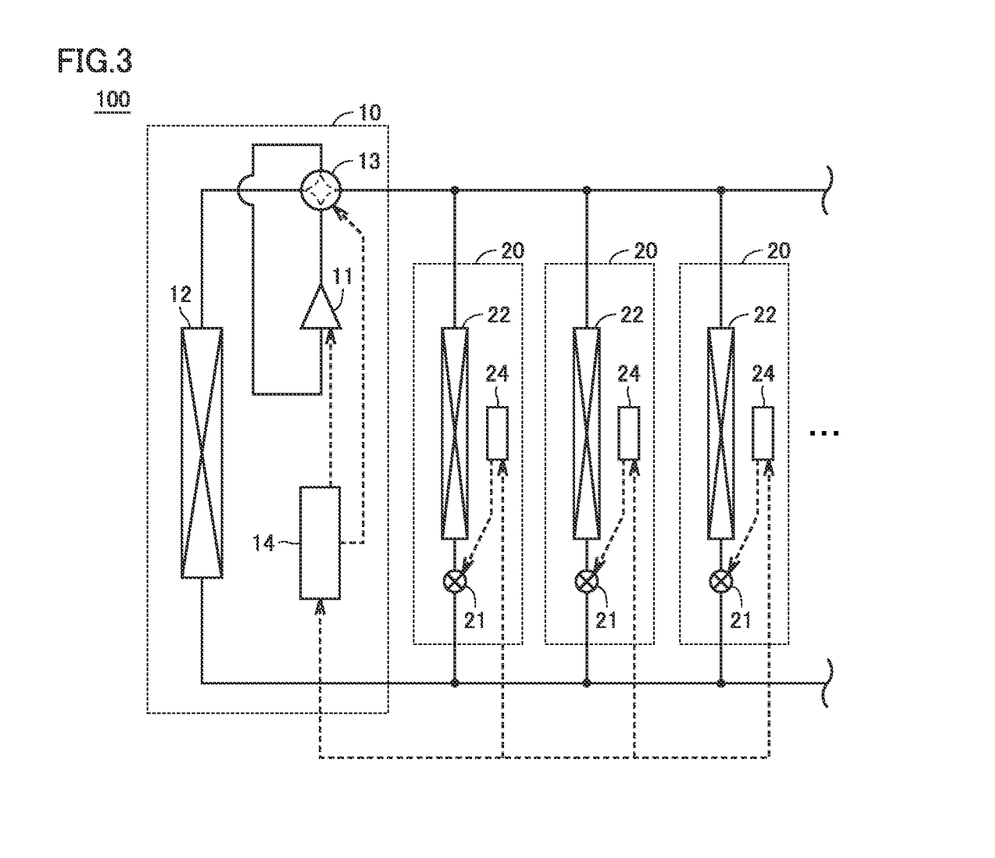
FIG. 3 is a functional block diagram showing a configuration of an air conditioner shown in FIG. 1.

FIG. 3 is a functional block diagram showing a configuration of air conditioner 100 shown in FIG. 1. As shown in FIG. 3, heat source unit 10 includes a compressor 11, a heat exchanger 12, a four-way valve 13, and a controller 14 (a second controller). One or more indoor units 20 each include an expansion valve 21, a heat exchanger 22, and a controller 24 (the second controller). Air conditioner 100 selectively performs a cooling operation and a heating operation, and receives a demand control command from demand controller 1 to perform a demand operation.

Controller 14 controls a drive frequency for compressor 11 to control an amount of refrigerant discharged from compressor 11 per unit time. Controller 14 controls a degree of opening of expansion valve 21 via controller 24. Controller 14 controls four-way valve 13 to switch between the cooling operation and the heating operation a direction in which the refrigerant circulates. Controllers 14 and 24 can each have a configuration similar to that of demand controller 1 shown in FIG. 2. Controllers 14 and 24 may be integrally formed.

In the cooling operation, the refrigerant circulates through compressor 11, four-way valve 13, heat exchanger 12, expansion valve 21, heat exchanger 22, and four-way valve 13 in this order. In the cooling operation, controller 14 controls the degree of opening of expansion valve 21 so that the degree of superheating of refrigerant flowing between heat exchanger 22 and compressor 11 approaches a target degree of superheating. In the heating operation, the refrigerant circulates through compressor 11, four-way valve 13, heat exchanger 22, expansion valve 21, and heat exchanger 12 in this order. In the heating operation, controller 14 controls the degree of opening of expansion valve 21 so that the degree of supercooling of the refrigerant flowing between heat exchanger 22 and expansion valve 21 approaches a target degree of supercooling.

Figure 4:
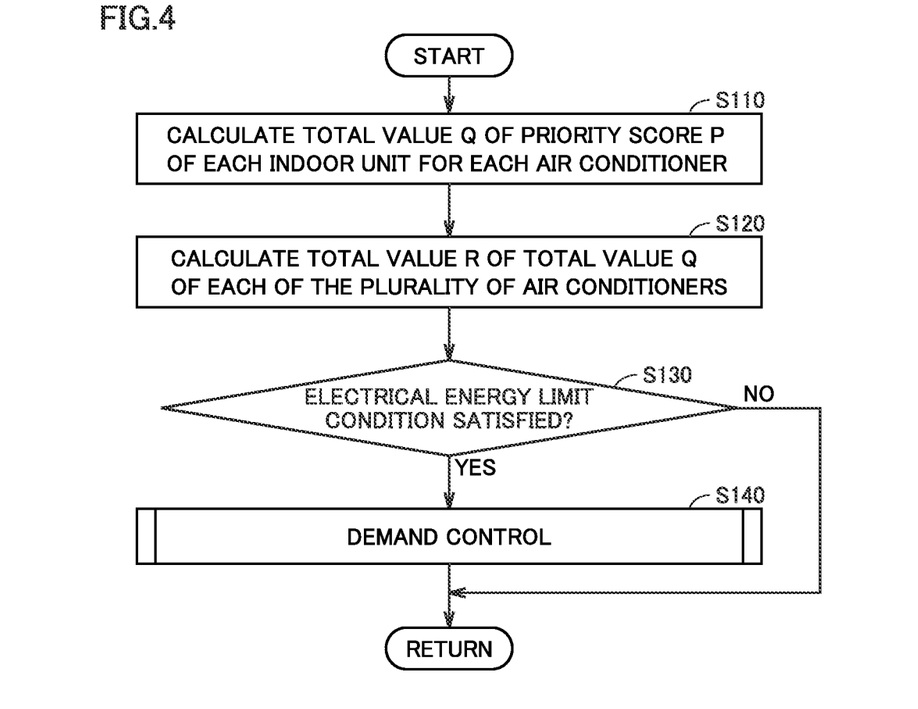
FIG. 4 is a flowchart of an electrical energy monitoring process performed by the demand controller shown in FIG. 1.

FIG. 4 is a flowchart of an electrical energy monitoring process performed by demand controller 1 shown in FIG. 1. The electrical energy monitoring process is invoked by a main routine (not shown) that controls demand controller 1 integrally. Hereinafter, a step is simply referred to as S. A priority score of a j-th indoor unit 20 of an i-th air conditioner 100 is denoted as $P_{i,j}$. Indices i and j are each a natural number.

As shown in FIG. 4, demand controller 1 in S110 calculates for each of the plurality of air conditioners 100 a total value $Q_i$ (a first total value) of a priority score of each of one or more indoor units 20 included in air conditioner 100, as indicated by the following expression (1), and proceeds to S120. In the expression (1), a natural number $M_i$ is the number of one or more indoor units 20 included in the i-th air conditioner 100.

[Expression 1]

Expression 1

$$Q_i = \Sigma_{j=1}^{j=M_i} P_{i,j} \quad (1)$$

In S120, demand controller 1 calculates a total value R (a second total value) of total value $Q_i$ of each of the plurality of air conditioners 100, as indicated by the following expression (2), and proceeds to S130. In the expression (2), a natural number N is the number of the plurality of air conditioners 100.

[Expression 2]

Expression 2

$$R = \Sigma_{i=1}^{i=N} Q_i \quad (2)$$

In S130, demand controller 1 determines whether the condition that demand request DR is received (i.e., an electrical energy limit condition) is satisfied. When demand request DR is not received (NO in S130), demand controller 1 returns the process back to the main routine. When demand request DR is received (YES in S130), demand controller 1 performs demand control in S140. The electrical energy limit condition is not limited to the condition that demand request DR is received. The electrical energy limit condition may include the condition that demand controller 1 directly measures electrical energy per unit time of the plurality of air conditioners 100 and the electrical energy exceeds reference electrical energy.

Figure 5:
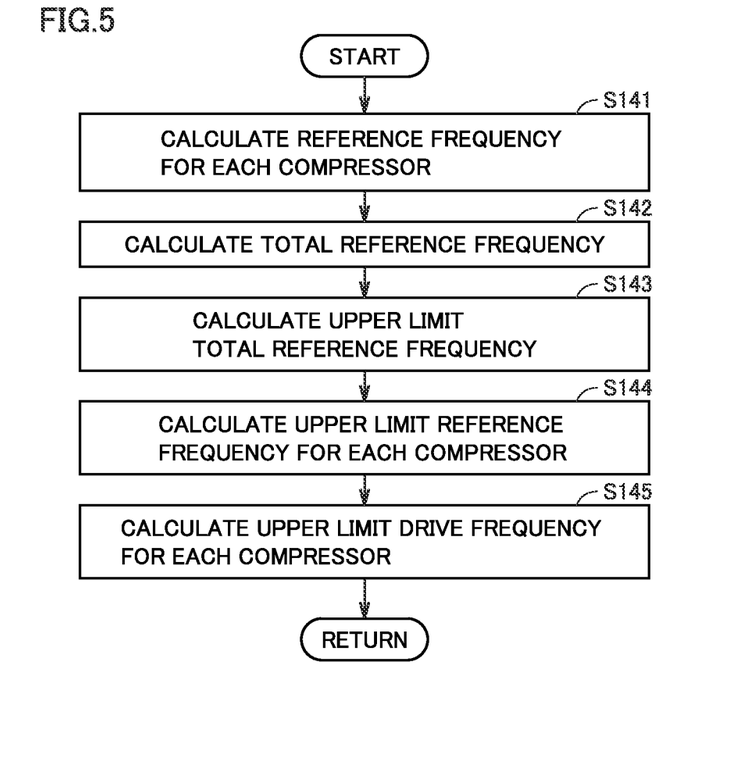
FIG. 5 is a flowchart of a specific process of demand control indicated in FIG. 4.

FIG. 5 is a flowchart of a specific process of the demand control (S140) indicated in FIG. 4. As indicated in FIG. 5, demand controller 1 in S141 calculates for the plurality of air conditioners 100 a reference frequency $W_i$ (an index value) as a product of a drive frequency $H_i$ for the compressor of the i-th air conditioner, a stroke volume (a suction volume) $V_i$ of the compressor, and an inverse of a reference stroke volume $V_r$ (i.e., a first product), as indicated by the following expression (3), and proceeds to S142. Drive frequency $H_i$ is a drive frequency when demand controller 1 receives demand request DR. Reference frequency $W_i$ is an index value of electrical energy consumed per unit time by the air conditioner, that has drive frequency $H_i$ and in addition thereto stroke volume $V_i$ also reflected therein. Reference stroke volume $V_r$ is a reference value for normalizing stroke volume $V_i$, and may for example be 1 cc.

[Expression 3]

Expression 3

-continued $$W_i = H_i \times \frac{V_i}{V_r} \quad (3)$$

In S142, demand controller 1 calculates a total reference frequency G (a total index value) of reference frequency $W_i$, as indicated by the following expression (4), and proceeds to S143.

[Expression 4]

Expression 4

$$G = \Sigma_{i=1}^{i=N} W_i \quad (4)$$

In S143, demand controller 1 calculates an upper limit total reference frequency U as a product of an electrical energy limit rate D and total reference frequency G, as indicated by the following expression (5), and proceeds to S144.

[Expression 5]

Expression 5

$$U = D \times G \quad (5)$$

In S144, demand controller 1 calculates an upper limit reference frequency $E_i$ as a product of upper limit total reference frequency U and a ratio of total value $Q_i$ to total value R, as indicated by the following expression (6), and proceeds to S145.

[Expression 6]

Expression 6

$$E_i = U \times \frac{Q_i}{R} \quad (6)$$

In S145, demand controller 1 calculates an upper limit drive frequency $Z_i$ as a product of upper limit reference frequency $E_i$, reference stroke volume $V_r$, and an inverse of stroke volume $V_i$ (i.e., a second product), as indicated by the following expression (7), and returns the process back to the main routine. The i-th air conditioner continues an air conditioning operation with upper limit drive frequency $Z_i$ set as an upper limit value for the drive frequency for the compressor included in the air conditioner.

[Expression 7]

Expression 7

$$Z_i = E_i \times \frac{V_r}{V_i} \quad (7)$$

Demand controller 1 sets a drive frequency for compressor 11 depending on the ratio of total value $Q_i$ to total value R, as indicated in the expression (6). Demand controller 1, in the demand control, suppresses decrease of the drive frequency for compressor 11 included in air conditioner 100 having a relatively high priority score among the plurality of air conditioners 100. The drive frequency for compressor 11 correlates with the electrical energy consumed by compressor 11 per unit time. The electrical energy of compressor 11 occupies a large proportion of the electrical energy consumed by air conditioner 100 per unit time. Therefore, by setting a drive frequency for compressor 11 in accordance with the ratio of total value $Q_i$ of air conditioner 100 to total value R, electrical energy is allocated preferentially to air conditioner 100 having a relatively high cost of using one or more indoor units 20. Air conditioning system 1000 can thus improve fairness of distribution of a cost accompanying utilization of air conditioning while achieving electrical energy limitation.

The electrical energy of the compressor can vary with the size of the compressor even if the compressor has the same drive frequency. Air conditioning system 1000, in distributing electrical energy in the demand control, allows a stroke volume correlated with the size of the compressor to be also considered in addition to the drive frequency for the compressor, and can thus further improve fairness of distribution of the cost accompanying utilization of air conditioning.

In the above description, fair distribution of electrical energy based on a cost of using one or more indoor units 20 among a plurality of air conditioners 100 has been described. Hereinafter, reference will be made to FIGS. 6, 7 and 8 to describe fair distribution in amount of refrigerant among one or more indoor units 20 in air conditioner 100, based on a cost of using one or more indoor units 20.

Figure 6:
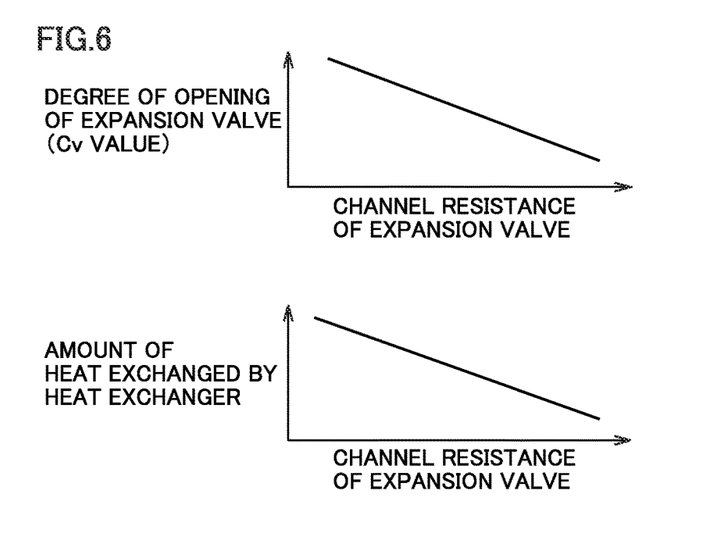
FIG. 6 is a diagram showing a relationship between a channel resistance of an expansion valve shown in FIG. 3 and a degree of opening (a Cv value) of the expansion valve, and a relationship between the channel resistance of the expansion valve and an amount of heat exchanged by a heat exchanger shown in FIG. 3.

FIG. 6 is a diagram showing a relationship between a channel resistance of expansion valve 21 shown in FIG. 3 and a degree of opening (a Cv value) of expansion valve 21, and a relationship between the channel resistance of expansion valve 21 and an amount of heat exchanged by heat exchanger 22 shown in FIG. 3. As shown in FIG. 6, the larger the degree of opening of expansion valve 21 is, the smaller the channel resistance of expansion valve 21 is. Further, the smaller the channel resistance of expansion valve 21 is, the larger the amount of heat exchanged by heat exchanger 22 is. The larger the amount of heat exchanged by heat exchanger 22 is, the larger an effect of air conditioning by indoor unit 20 is. That is, the larger the degree of opening of expansion valve 21 is, the larger the effect of air conditioning by indoor unit 20 is.

Accordingly, in air conditioner 100, for each of one or more indoor units 20, a degree of opening of expansion valve 21 included in indoor unit 20 is set in accordance with a ratio of a priority score $P_{i,j}$ of indoor unit 20 to total value $Q_i$ of air conditioner 100.

Figure 7:
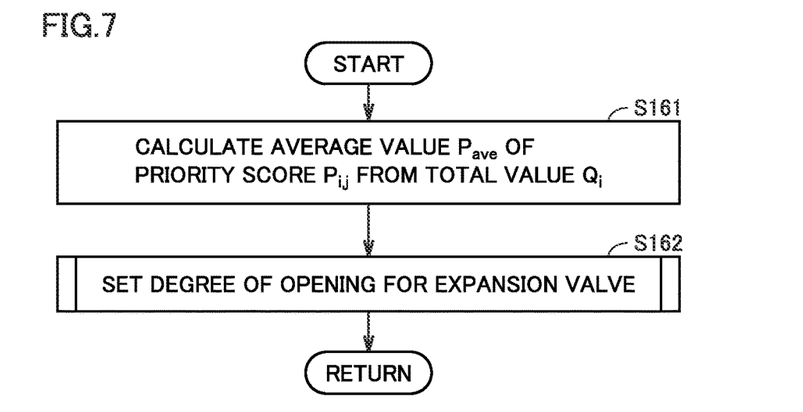
FIG. 7 is a flowchart of a process performed by a controller shown in FIG. 3 in response to a demand control command.

FIG. 7 is a flowchart of a process performed by controller 14 shown in FIG. 3 in response to a demand control command. The process shown in FIG. 7 is invoked by a main routine (not shown) that integrally controls air conditioner 100.

As shown in FIG. 7, in S161, controller 14 calculates an average value $P_{ave}$ of priority score $P_{i,j}$ of each of one or more indoor units 20 from total value $Q_i$ of air conditioner 100 and number $M_i$ of one or more indoor units 20, as indicated by the following expression (8), and proceeds to S162.

[Expression 8]

Expression 8

$$P_{ave} = \frac{Q_i}{M_i} \qquad (8)$$

In S162, controller 14 sets for each of one or more indoor units 20 a degree of opening of expansion valve 21 included in indoor unit 20 according to a ratio of priority score $P_{i,j}$ of indoor unit 20 to total value $Q_i$, and returns the process back to the main routine.

Figure 8:
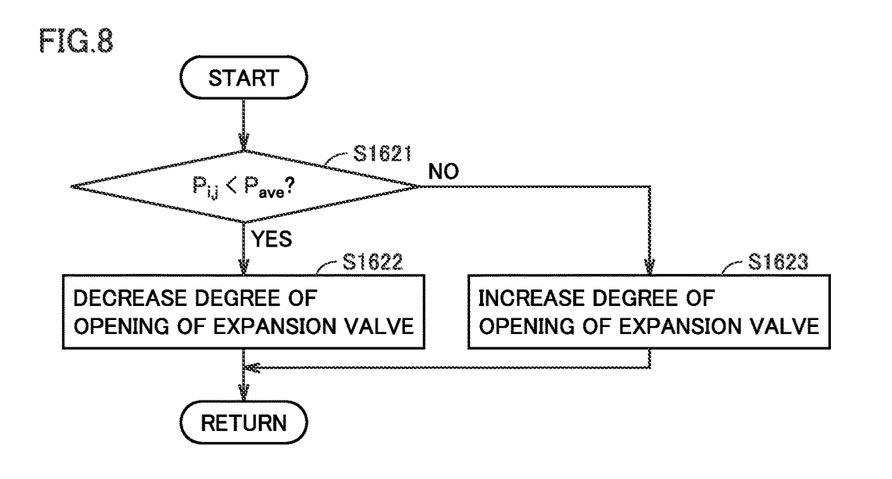
FIG. 8 is a flowchart of a specific process for setting a degree of opening of the expansion valve as indicated in FIG. 7.

FIG. 8 is a flowchart of a specific process for step S162 of setting a degree of opening of expansion valve 21 as indicated in FIG. 7. As shown in FIG. 8, in S1621, controller 14 determines whether the condition that priority score $P_{i,j}$ of indoor unit 20 is smaller than average value $P_{ave}$ is satisfied. When priority score $P_{i,j}$ is smaller than average value $P_{ave}$ (YES in S1621), then, in S1622, controller 14 decreases the degree of opening of expansion valve 21 included in indoor unit 20 to be smaller than that when whether the condition is satisfied is determined in S1621, and controller 14 returns the process back to the main routine. When priority score $P_{i,j}$ is equal to or larger than average value $P_{ave}$ (NO in S1621), then in S1623, controller 14 increases the degree of opening of expansion valve 21 included in indoor unit 20 to be larger than that when whether the condition is satisfied is determined in S1621, and controller 14 returns the process back to the main routine.

In the cooling operation, the degree of opening of expansion valve 21 may be decreased by increasing the target degree of superheating in S1622, and the degree of opening of expansion valve 21 may be increased by decreasing the target degree of superheating in S1623. In the heating operation, the degree of opening of expansion valve 21 may be decreased by increasing the target degree of supercooling in S1622, and the degree of opening of expansion valve 21 may be increased by decreasing the target degree of supercooling in S1623.

The condition in S1621 that priority score $P_{i,j}$ is smaller than average value $P_{ave}$ is the same, from the expression (8), as the condition that the following expression (9) is satisfied. The condition that the expression (9) is satisfied is the condition that a ratio of priority score $P_{i,j}$ to total value $Q_i$ is smaller than an inverse of number $M_i$ of one or more indoor units 20.

[Expression 9]

Expression 9

$$\frac{P_{i,j}}{Q_i} < \frac{1}{M_i} \qquad (9)$$

Since controller 14 sets a degree of opening of expansion valve 21 using whether the condition that the expression (9) is satisfied is satisfied, controller 14 sets the degree of opening of expansion valve 21 included in indoor unit 20 according to a ratio of priority score of indoor unit 20 to total value $Q_i$. Controller 14, in the demand control, increases a degree of opening of an expansion valve included in one or more indoor units 20 having a relatively high cost of using one or more indoor units 20. Since expansion valve 21 serves as a flow rate adjusting valve configured to adjust refrigerant passing through indoor unit 20, the larger the degree of opening of expansion valve 21 is, the larger the amount of the refrigerant passing through indoor unit 20 is. Air conditioning system 1000 allows refrigerant to be allocated preferentially to indoor unit 20 having a relatively high cost of using it, and can thus improve fairness of distribution, even among one or more indoor units 20, of a cost accompanying using air conditioning by air conditioning system 1000.

Modification of First Embodiment

In a modified example of the first embodiment, a configuration in which demand control is followed by electrical energy adjustment control to suppress excessive deviation from a targeted electrical energy will be described.

Figure 9:
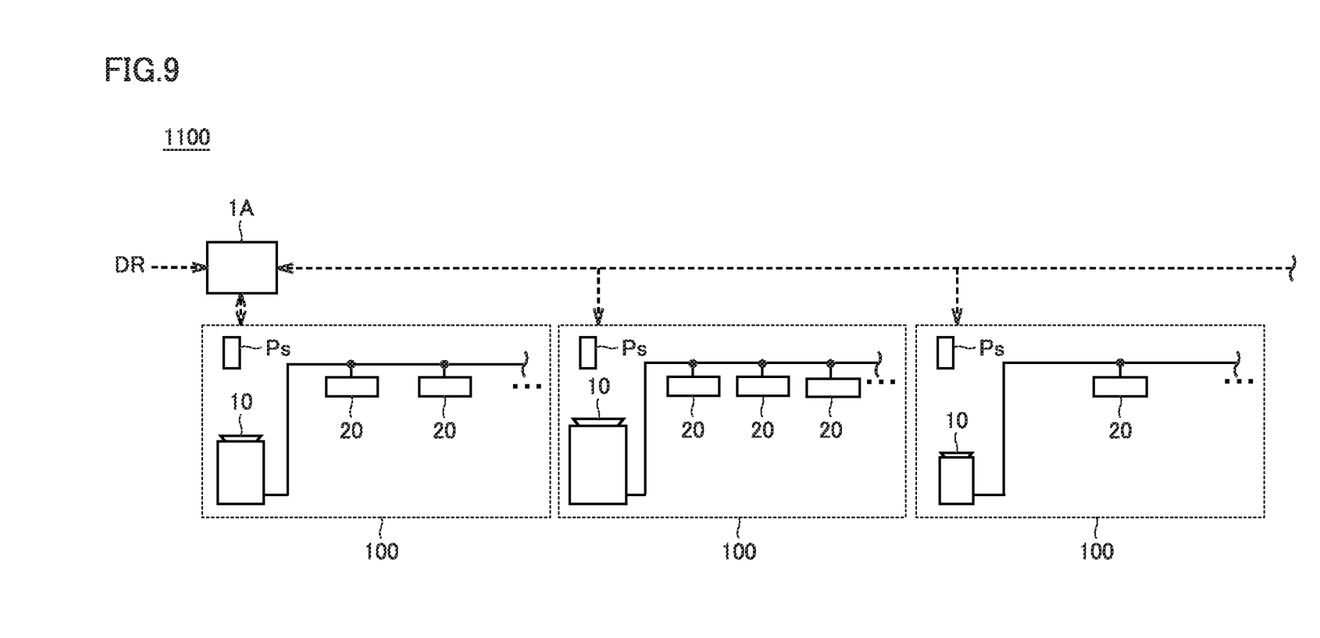
FIG. 9 is a functional block diagram showing a configuration of an air conditioning system according to a modified example of the first embodiment.

FIG. 9 is a functional block diagram showing a configuration of an air conditioning system 1100 according to the modified example of the first embodiment. Air conditioning system 1100 is configured such that demand controller 1 shown in FIG. 1 is replaced with a demand controller 1A and an electrical energy sensor Ps configured to measure electrical energy consumed by air conditioner 100 is added to each of a plurality of air conditioners 100. The remainder is the same, and accordingly, will not be described repeatedly.

Figure 10:
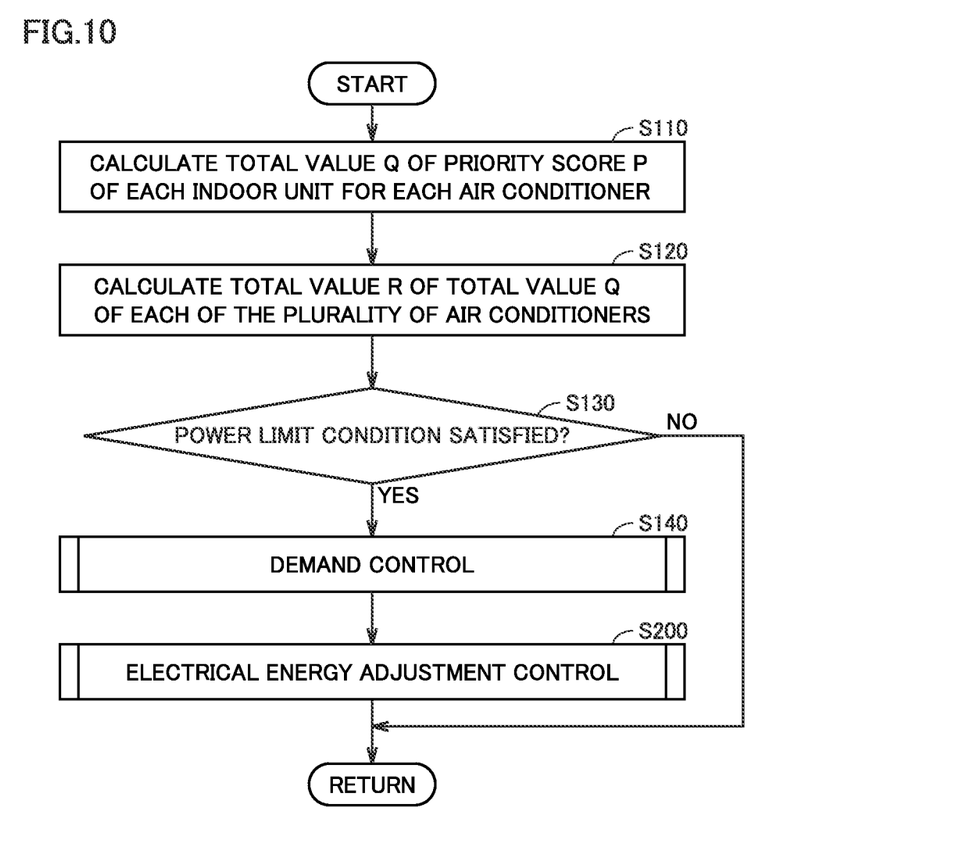
FIG. 10 is a flowchart of an electrical energy monitoring process performed by a demand controller shown in FIG. 9.

FIG. 10 is a flowchart of an electrical energy monitoring process performed by demand controller 1A shown in FIG. 9. The electrical energy monitoring process is invoked by a main routine (not shown) that integrally controls demand controller 1A. The flowchart shown in FIG. 9 is a flowchart in which demand control S140 indicated in FIG. 4 is followed by electrical energy adjustment control S200. The remainder is the same, and accordingly, will not be described repeatedly.

As shown in FIG. 10, demand controller 1A performs S110, S120, S130, and S140 as done in the first embodiment and subsequently performs electrical energy adjustment control in S200, and thereafter returns the process back to the main routine.

Figure 11:
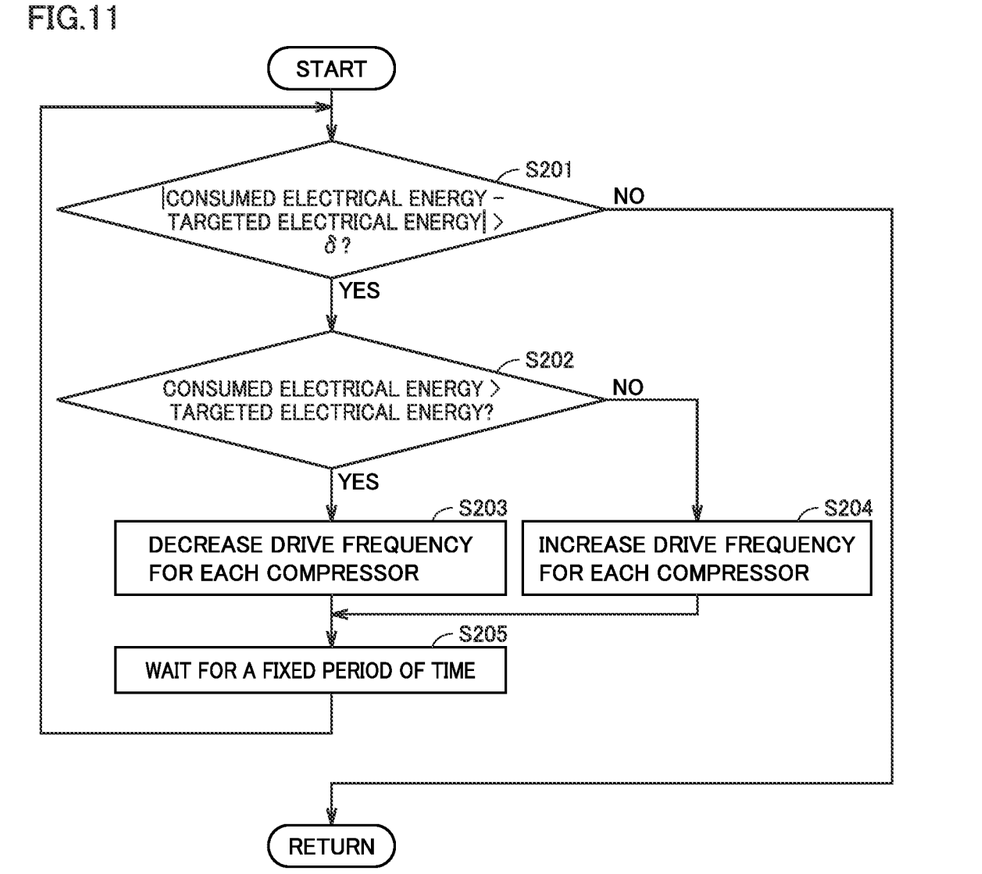
FIG. 11 is a flowchart of a specific process of electrical energy adjustment control indicated in FIG. 10.

FIG. 11 is a flowchart of a specific process of electrical energy adjustment control S200 indicated in FIG. 10. As shown in FIG. 11, in S201, demand controller 1A determines whether an absolute value of a value obtained by subtracting targeted electrical energy from consumed electrical energy is larger than a reference value δ (a second reference value). When the absolute value is less than or equal to reference value δ (NO in S201), demand controller 1A returns the process back to the main routine. When the absolute value is larger than reference value δ (YES in S201), demand controller 1A proceeds to S202. Reference value δ can be determined appropriately through an actual experiment or a simulation.

In S202, demand controller 1A determines whether the consumed electrical energy is larger than the targeted electrical energy. When the consumed electrical energy is larger than the targeted electrical energy (YES in S202), demand controller 1A proceeds to S203 to decrease the drive frequency for compressor 11 included in each of the plurality of air conditioners 100 to be lower than that when whether the condition is satisfied is determined in S202, and demand controller 1A proceeds to S205. When the consumed electrical energy is equal to or less than the targeted electrical energy (NO in S202), demand controller 1A proceeds to S204 to increase the drive frequency for compressor 11 included in each of the plurality of air conditioners 100 to be higher than that when whether the condition is satisfied is determined in S202, and demand controller 1A proceeds to S205. After waiting for a fixed period of time in S205, demand controller 1A returns the process back to S201.

Air conditioning system 1100 can suppress deviation between consumed electrical energy and targeted electrical energy after the demand control to reference value δ or less, and even under electrical energy limitation, permitted electrical energy can sufficiently be used.

Thus, the air conditioning system and method for controlling electrical energy thereof according to the first embodiment and a modified example thereof can improve fairness of distribution of a cost accompanying utilization of air conditioning while achieving electrical energy limitation.

Second Embodiment

In the first embodiment, a configuration in which electrical energy is allocated preferentially to an air conditioner having a relatively high priority score has been described. According to the first embodiment, a cost of using an indoor unit under electrical energy limitation can vary with a relative relationship in magnitude of a priority score of the indoor unit, rather than the priority score per se. In a second embodiment, a configuration in which electrical energy allocated is limited based on a priority score per se so that a cost of using an indoor unit corresponds to the priority score will be described.

Figure 12:
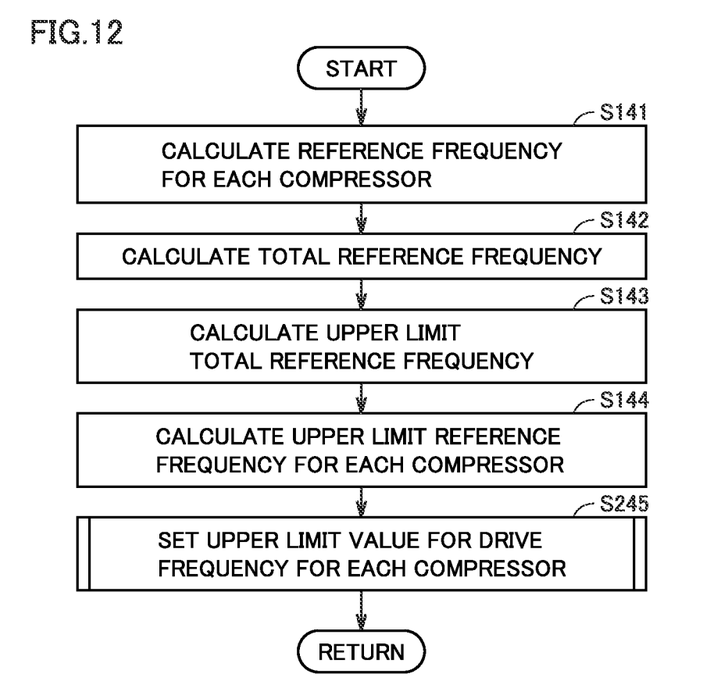
FIG. 12 is a flowchart of a demand control process performed by a demand controller of an air conditioning system according to a second embodiment.

FIG. 12 is a flowchart of a demand control process performed by a demand controller of an air conditioning system according to the second embodiment. The process indicated in FIG. 12 is a process with the FIG. 5 S145 replaced with S245. The remainder is the same, and accordingly, will not be described repeatedly.

As shown in FIG. 12, after performing S141 to S144 in the same manner as in the first embodiment, the demand controller proceeds to S245 to set an upper limit value for the drive frequency for the compressor included in each of one or more air conditioners, and the demand controller returns the process back to the main routine.

Figure 13:
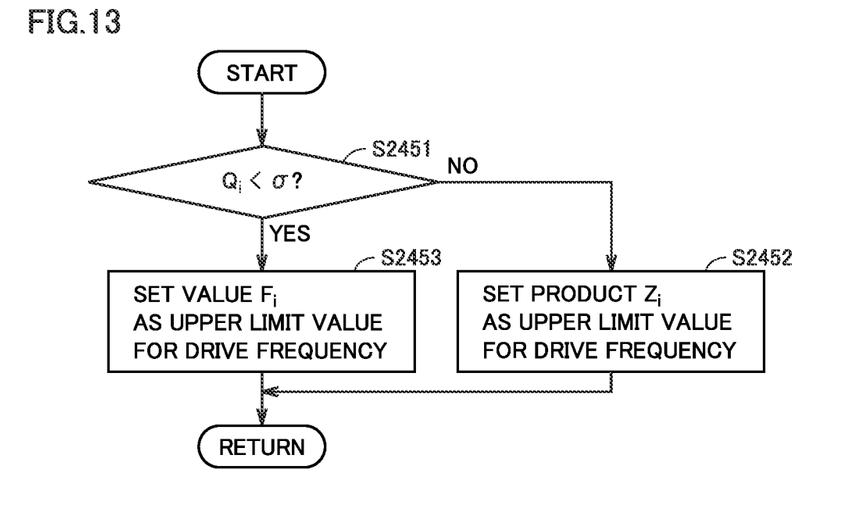
FIG. 13 is a flowchart of a specific process for setting an upper limit value for a drive frequency for a compressor as indicated in FIG. 12.

FIG. 13 is a flowchart of a specific process for setting an upper limit value for the drive frequency for the compressor, as indicated in FIG. 12 (S245). The demand controller performs the FIG. 13 process for each of one or more air conditioners. FIG. 13 shows the process for an i-th air conditioner.

As shown in FIG. 13, in step S2451, the demand controller determines whether total value $Q_i$ is smaller than a reference value σ (a first reference value). When total value $Q_i$ is equal to or larger than reference value σ (the first reference value) (NO in S2451), the demand controller proceeds to S2452 to set product $Z_i$ that is calculated according to the expression (7) as an upper limit value for the drive frequency for the compressor included in the i-th air conditioner, and the demand controller returns the process back to the main routine. When total value $Q_i$ is smaller than reference value σ (the first reference value) (YES in S2451), the demand controller proceeds to S2453 to set a value $F_i$ smaller than product $Z_i$ as the upper limit value for the drive frequency for the compressor included in the i-th air conditioner, and the demand controller returns the process back to the main routine. Value $F_i$ is calculated, for example, by multiplying product $Z_i$ by a predetermined coefficient smaller than one or a coefficient corresponding to total value $Q_i$. Reference value σ can be determined appropriately through an actual experiment or a simulation.

Thus, the air conditioning system and method for controlling electrical energy thereof according to the second embodiment can further improve fairness of distribution of a cost accompanying utilization of air conditioning while achieving electrical energy limitation than the first embodiment.

The embodiments disclosed herein are also intended to be combined within a consistent scope as appropriate and thus implemented. It should be understood that the embodiments disclosed herein have been described for the purpose of illustration only and in a non-restrictive manner in any respect. The scope of the present disclosure is defined by the terms of the claims, rather than the description above, and is intended to include any modifications within the meaning and scope equivalent to the terms of the claims.

REFERENCE SIGNS LIST 1,1A demand controller, 10 heat source unit, 11 compressor, 12, 22 heat exchanger, 13 four-way valve 14, 24 controller, 20 indoor unit, 21 expansion valve, 91 circuitry, 92 memory, 93 communication unit, 94 input/output unit, 95 bus, 100 air conditioner, 1000, 1100 air conditioning system, NW network, Ps electrical energy sensor.

The invention claimed is:

1. An air conditioning system comprising:
   one or more air conditioners in which refrigerant circulates; and
   a first controller configured to limit electrical energy consumed per unit time by the one or more air conditioners when an electrical energy limit condition is satisfied,
   the one or more air conditioners each including a compressor and one or more indoor units,
   a score corresponding to an indoor unit usage cost being preset for each of the one or more indoor units,
   the first controller being configured to:
      for each of the one or more air conditioners, calculate a first total value of the score of each of the one or more indoor units;
      calculate a second total value of the first total value of each of the one or more air conditioners; and
      for each of the one or more air conditioners, set a drive frequency for the compressor according to a ratio of the first total value to the second total value.

2. The air conditioning system according to claim 1, wherein when the electrical energy limit condition is satisfied, the first controller is configured to:
   obtain an electrical energy limit rate indicating a ratio of targeted electrical energy to the electrical energy consumed when the electrical energy limit condition is determined;
   calculate a first product of a stroke volume of the compressor included in each of the one or more air conditioners, the drive frequency for the compressor, and an inverse of a reference stroke volume, as an index value for electrical energy consumed per unit time;
   calculate a total index value of a plurality of index values of the one or more air conditioners; and
   set a value equal to or less than a second product of the total index value, the electrical energy limit rate, the ratio of the first total value of each of the one or more air conditioners to the second total value, the reference stroke volume, and an inverse of the stroke volume of the compressor, as an upper limit value for the drive frequency for the compressor.

3. The air conditioning system according to claim 2, wherein, for each of the one or more air conditioners, the first controller is configured to:
   set the upper limit value to the second product when the first total value is larger than a first reference value; and
   set the upper limit value to a value smaller than the second product when the first total value is smaller than the first reference value.

4. The air conditioning system according to claim 2, wherein when an absolute value of a value obtained by subtracting the targeted electrical energy from the electrical energy is larger than a second reference value after setting for each of the one or more air conditioners a drive frequency for the compressor included in response to the electrical energy limit condition being satisfied,
   when the electrical energy is larger than the targeted electrical energy, the first controller is configured to decrease a drive frequency for the compressor included in each of the one or more air conditioners to be lower than when the electrical energy is compared with the targeted electrical energy; and
   when the electrical energy is smaller than the targeted electrical energy, the first controller is configured to increase a drive frequency for the compressor included in each of the one or more air conditioners to be higher than when the electrical energy is compared with the targeted electrical energy.

5. The air conditioning system according to claim 1, wherein
   the one or more air conditioners each further include a second controller configured to control the one or more indoor units,
   the one or more indoor units each include an expansion valve and a second heat exchanger, the refrigerant passing through the expansion valve and the second heat exchanger, and
   the second controller sets, for each of the one or more indoor units, a degree of opening of the expansion valve in accordance with a ratio of the score to the first total value.

6. A method for controlling electrical energy of an air conditioning system comprising one or more air conditioners in which refrigerant circulates, the method limiting electrical energy consumed per unit time by the one or more air conditioners when an electrical energy limit condition is satisfied,
   the one or more air conditioners each including a compressor and one or more indoor units,
   a score corresponding to an indoor unit usage cost being preset for each of the one or more indoor units,
   the method comprising:
   for each of the one or more air conditioners, calculating a first total value of the score of each of the one or more indoor units;
   calculating a second total value of the first total value of each of the one or more air conditioners; and
   for each of the one or more air conditioners, setting a drive frequency for the compressor according to a ratio of the first total value to the second total value.

* * * * *